July 7, 1931.　　　F. C. BOWMAN　　　1,813,694
AERIAL NAVIGATION
Filed June 14, 1929
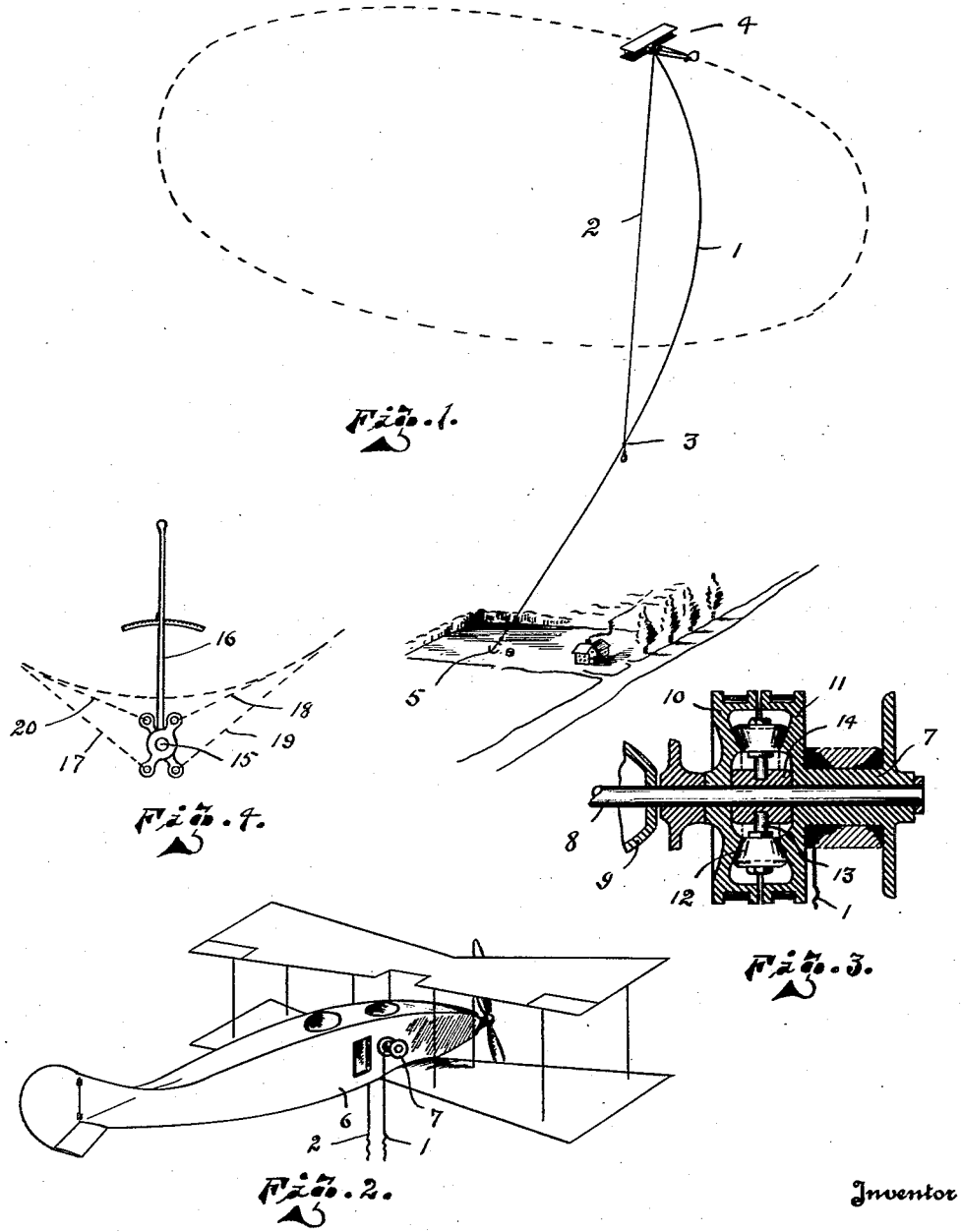

Patented July 7, 1931

1,813,694

UNITED STATES PATENT OFFICE

FREDERICK C. BOWMAN, OF DULUTH, MINNESOTA

AERIAL NAVIGATION

Application filed June 14, 1929. Serial No. 370,937.

This invention relates to aerial navigation and has special reference to a novel method and mechanism for mechanical communication intermediate of the earth and aircraft.
The principal object of the invention is to produce a practical, simple, and efficient device and method of this character.

Other objects and advantages of the invention will appear in the following description thereof.

Referring now to the accompanying drawings, forming part of this application, and wherein like reference characters indicate like parts;
Figure 1 is a diagrammatic view of the invention being put into practice;

Figure 2 is an enlarged perspective view of an airplane with part of the mechanism pertaining to the invention applied thereto;
Figure 3 is an enlarged sectional view of one of the line drums; and Figure 4 is an enlarged view of the control mechanism for the drum.

The advantage of practical means and method for such communication and necessity in some instances for carrying out the objects sought is obvious, and the novel method involved in the invention for maintaining such communication resides in the following steps. Assuming that a predetermined point with which it is desired to communicate by a self propelled aircraft in action has been established, the terminus of a line is dropped to or adjacent said point, where it may become automatically anchored, or secured by an attendant and anchored manually. The aircraft immediately establishes a circular course about said point, governed as nearly as practicable by the length of line between it and the point so as not to bring undue stress upon the line until the desired load has been attached, when the anchorage may be released and the load drawn up by any suitable mechanism carried by the machine, the latter of course being at liberty to assume a straightaway course in any direction desired during such elevating process, or as illustrated in Figure 1 of the drawings, the anchoring line 1 may be allowed to remain anchored while a second line 2 with any suitable form of trolley 3 upon the line 1 may be lowered to the point of anchorage when it may be loaded and drawn to the aircraft or lowered therefrom as desired for repeated trips to and from the earth and aircraft, the latter being indicated at 4 and the terminals of the anchor line at 5.

In carrying out this phase of the invention the free end of the anchor line 1 may be attached to a parachute and dropped from the aircraft and time thus afforded for control by the craft as to its point of lodgement upon the ground, it obviously being necessary for the craft to assume its circular course for such control or it may be heavily weighted and dropped together with sufficient free coils of line to permit of ample leeway after striking the earth for the aircraft to assume its circular course, the aircraft of course flying as near as possible to the point of anchorage in the latter event.

As a practical form of mechanism for carrying out the invention I have illustrated the aircraft 6 as being provided with one or more motor driven winding drums one being indicated at 7, the operating shaft of which is illustrated at 8 and is in this instance the armature shaft of an electric motor, the armature being shown at 9 and controlled in any desired manner from a suitable generator not shown in the aircraft; the winding drum being shown as protruding from the side of the aircraft.

Intermediate of the winding drum and the motor I have illustrated the differential power transmitting mechanism comprising the two geared discs 10 and 11, the latter forming the innermost head of the drum 7 and intermediate of which discs and in constant mesh therewith are a plurality of beveled gears 12 loosely carried upon the radial arms 13 which are fixed to the hub 14 keyed to the armature shaft 8 and through which hub power and motion are transmitted.

Brake band seats are formed upon the circumferential edges of the gear discs 10 and 11 and each provided with a suitable brake band the control of which I propose to mount upon a single shaft 15 as diagrammatically illustrated in Figure 4, said shaft being manually controlled as by the lever 16 which may be set in any desired position to either hold or brake the winding drum simultaneously with performing the reverse action upon the disc 10, and by which it is obvious that no matter at what speed the armature shaft may be rotated the winding of the drum may be readily controlled so that a reasonable tension may be maintained on the line at all times while at anchorage, or in other words provides a simple automatic holding and winding mechanism for the line.

In the diagram shown in Figures 4, 17 and 18 represent the termini of one band, while 19 and 20 represent the termini of the other band so that by rotation of the shaft 15 one band is tightened simultaneously with the slacking of the other.

Where a hoisting line 2 is employed in conjunction with the anchor or lead line 1 it is evident that a second winding drum would be employed and which may be situated any place desired on the aircraft for convenience in operation or as before stated the anchor line may alone be used for receiving the load.

It will further be apparent that if it is desired to unload from the aircraft once the anchor line is made fast, objects may be lowered by the line 2; this latter being particularly advantageous in landing supplies to those stranded or otherwise in jeopardy.

From the foregoing it is apparent that I have devised a simple and practical method and one form of mechanism for successfully communicating between the earth and a navigating aircraft in the art of conveying objects, and particularly adaptable for use in life saving either on land or at sea.

Having thus described my invention, what I claim and desire to secure by Letters Patent, is:

1. The herein described method of maintaining communication between an aircraft and the earth, of first dropping from the aircraft an anchor line to a predetermined point on the earth, when said anchorage is established assuming a circular course by said aircraft about said point until the desired communication is concluded, when a withdrawal course is assumed.

2. The herein described method of maintaining communication between an aircraft and the earth comprising dropping from the aircraft an anchor line to a predetermined point on the earth, when such anchorage is established starting and maintaining a circular course with the aircraft, operating a second line down and up upon the anchor line for the purpose desired, then weighing anchor and away with the aircraft.

3. The combination with a self propelled aircraft, of a winding drum, and anchoring line operable on said drum, selective means for maintaining uniform tension on said line after being anchored, and a second line operable upon the anchoring line.

4. The herein described method of maintaining transportation communication between an aircraft and the earth comprising first lowering a line to a predetermined point on the earth, temporarily fixing said line at said point, establishing a circular course for the aircraft and maintaining same while transportation of objects is effected on the line.

5. The herein described method of receiving and discharging objects to and from the earth from an aircraft characterized by first dropping an anchor from the craft, simultaneously with the anchor lodging on the earth assuming a circular course by the aircraft and maintaining uniform stress upon the tether of the anchor, and using the tether for a trolley for back and/or forth communication intermediate of the aircraft and earth.

6. The herein described method of establishing and maintaining communication between an aircraft in flight and the earth, comprising dropping a tethered object from the aircraft to establish said communication, assuming a circular course by said aircraft until said communication is established and concluded, when a withdrawal course is assumed by the aircraft.

In testimony whereof I affix my signature.

FREDERICK C. BOWMAN.